(12) United States Patent
Tseytlin et al.

(10) Patent No.: US 8,526,941 B2
(45) Date of Patent: Sep. 3, 2013

(54) APPARATUS AND METHODS FOR MOBILITY MANAGEMENT IN HYBRID TERRESTRIAL-SATELLITE MOBILE COMMUNICATIONS SYSTEMS

(75) Inventors: Michael Tseytlin, Bethesda, MD (US); Santanu Dutta, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 1416 days.

(21) Appl. No.: 11/770,063

(22) Filed: Jun. 28, 2007

(65) Prior Publication Data
US 2008/0182572 A1    Jul. 31, 2008

Related U.S. Application Data

(60) Provisional application No. 60/806,176, filed on Jun. 29, 2006.

(51) Int. Cl.
*H04W 4/00* (2009.01)
*H04W 40/00* (2009.01)
*H04W 36/00* (2009.01)

(52) U.S. Cl.
USPC ........... 455/427; 455/428; 455/429; 455/430; 455/435.1; 455/435.2; 455/436; 455/437; 455/438; 455/439

(58) Field of Classification Search
USPC ................................................. 455/427–436
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |

(Continued)

FOREIGN PATENT DOCUMENTS

| EP | 0 506 255 A2 | 9/1992 |
| EP | 0 506 255 A3 | 9/1992 |

(Continued)

OTHER PUBLICATIONS

Invitation to Pay Additional Fees, PCT International Application No. PCT/US2007/015077, Mar. 17, 2008.

(Continued)

*Primary Examiner* — Huy C Ho
(74) *Attorney, Agent, or Firm* — Myers Bigel Sibley & Sajovec, P.A.

(57) ABSTRACT

Communications between a terminal and a terrestrial base station are established. The terrestrial base station receives a request to monitor a satellite base station from the terminal. The terrestrial base station grants the request and receives monitoring information for the satellite base station corresponding to the request. Granting of the request may include suspending transmission from the terrestrial base station to the terminal for a period of time sufficient to allow the terminal to request the monitoring information from the satellite base station and receiving monitoring information may include receiving the requested monitoring information at the terrestrial base station via a communications path not including the terminal. Suspending transmission from the terrestrial base station to the terminal may be followed by resuming transmission to the terminal before receiving the monitoring information at the terrestrial base station. The communications path not including the terminal may include a terrestrial Access Service Network Gateway serving the terrestrial base station and a satellite Access Service Network Gateway serving the satellite base station. Handover techniques are also described.

19 Claims, 6 Drawing Sheets

(56) References Cited

U.S. PATENT DOCUMENTS

| | | |
|---|---|---|
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,539 A | 9/1998 | Dent |
| 5,812,947 A | 9/1998 | Dent |
| 5,826,188 A * | 10/1998 | Tayloe et al. ............ 455/428 |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A * | 12/2000 | Helm et al. .............. 455/436 |
| 6,160,994 A | 12/2000 | Wiedeman |
| 6,169,878 B1 | 1/2001 | Tawil et al. |
| 6,181,952 B1 * | 1/2001 | Murata ................ 455/552.1 |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,174,127 B2 | 2/2007 | Otten et al. |
| 7,181,161 B2 | 2/2007 | Karabinis |
| 7,203,490 B2 | 4/2007 | Karabinis et al. |
| 7,218,931 B2 | 5/2007 | Karabinis |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0090935 A1 * | 5/2004 | Courtney ................ 370/331 |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192395 A1 | 9/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |

| | | | |
|---|---|---|---|
| 2007/0072545 A1 | 3/2007 | Karabinis et al. | |
| 2007/0087690 A1 | 4/2007 | Karabinis | |
| 2007/0099562 A1 | 5/2007 | Karabinis et al. | |
| 2007/0129019 A1 | 6/2007 | Otten et al. | |

FOREIGN PATENT DOCUMENTS

| | | | |
|---|---|---|---|
| EP | 0 597 225 A1 | 5/1994 | |
| EP | 0 506 255 B1 | 11/1996 | |
| EP | 0 748 065 A2 | 12/1996 | |
| EP | 0 755 163 A2 | 1/1997 | |
| EP | 0 762 669 A2 | 3/1997 | |
| EP | 0 762 669 A3 | 3/1997 | |
| EP | 0 797 319 A2 | 9/1997 | |
| EP | 0 831 599 A2 | 3/1998 | |
| EP | 0 831 599 A3 | 3/1998 | |
| EP | 1 059 826 A1 | 12/2000 | |
| EP | 1 193 989 A1 | 4/2002 | |
| EP | 1 608 086 A2 | 12/2005 | |
| EP | 1608086 A2 | 12/2005 | |
| WO | WO99/34636 | 7/1999 | |
| WO | WO 99/34636 A1 | 7/1999 | |
| WO | WO96/28947 | 9/1999 | |
| WO | WO 01/54314 A1 | 7/2001 | |
| WO | WO 2004/112418 A1 | 12/2004 | |
| WO | WO2004/112418 A1 | 12/2004 | |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

International Search Report for PCT International Application No. PCT/US2007/015077, Jul. 23, 2008.

* cited by examiner

APPARATUS AND METHODS FOR MOBILITY MANAGEMENT IN HYBRID TERRESTRIAL-SATELLITE MOBILE COMMUNICATIONS SYSTEMS

CROSS-REFERENCE TO RELATED APPLICATIONS

This application claims the benefit of Provisional Application No. 60/806,176, filed Jun. 29, 2006, entitled Handoff in Hybrid Terrestrial Wireless Satellite Communications, assigned to the assignee of the present invention, the disclosure of which is hereby incorporated hereby by reference in its entirety as if set forth fully herein.

FIELD OF THE INVENTION

This invention relates to wireless communications systems, methods and components thereof and more particularly to satellite and terrestrial wireless communications systems, methods and components thereof.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application No. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein. Various techniques for coordination of operations of satellite and terrestrial components are described in U.S. Patent Application Publication No. 2005/0090256 to Dutta, entitled Systems and Methods for Mobility Management in Overlaid Mobile Communications Systems, and U.S. patent application Ser. No. 11/548,825 to Tronc et al. entitled Systems, Methods and Computer Program Products for Mobility Management in Hybrid Satellite/Terrestrial Wireless Communications Systems, filed Oct. 12, 2006, both of which are assigned to the assignee of the present invention, the disclosures of both of which are hereby incorporated herein by reference in their entirety as if set forth fully herein.

SUMMARY OF THE INVENTION

Some embodiments of the present invention provide wireless communications methods. Communications between a terminal and a terrestrial base station are established. The terrestrial base station receives a request to monitor a satellite base station from the terminal. The terrestrial base station grants the request and receives monitoring information for the satellite base station corresponding to the request. Granting of the request may include suspending transmission from the terrestrial base station to the terminal for a period of time sufficient to allow the terminal to request the monitoring information from the satellite base station and receiving monitoring information may include receiving the requested monitoring information at the terrestrial base station via a communications path not including the terminal. Suspending transmission from the terrestrial base station to the terminal may be followed by resuming transmission to the terminal before receiving the monitoring information at the terrestrial base station. The communications path not including the terminal may include a terrestrial Access Service Network Gateway serving the terrestrial base station and a satellite Access Service Network Gateway serving the satellite base station.

Further embodiments of the present invention provide mobility management methods for wireless communications. A first handoff request message for a handoff to a satellite base station is received from a terminal at a terrestrial base station. A corresponding second handoff request message is transmitted from the terrestrial base station to a controller of the satellite base station from the terrestrial base station. A first handoff confirmation message corresponding to the second handoff request message is received from the controller of the satellite base station at the terrestrial base station. A corresponding second handoff confirmation message is transmitted to the terminal from the terrestrial base station. The first handoff request message may include satellite link information for the terminal.

In further embodiments, receiving a first handoff request message for a handoff to a satellite base station from a terminal at a terrestrial base station may be preceded by the terrestrial base station pre-registering the terminal with the satellite base station, such that such satellite link information may not be needed. The terrestrial base station may be controlled by a terrestrial Access Services Network Gateway and the satellite base station may be controlled by a satellite Access Services Network Gateway coupled to the terrestrial Access Services Network Gateway, and transmitting the second handoff request message may be followed by and receiving the first handoff confirmation message may be preceded by negotiating between the terrestrial Access Services Network Gateway and the satellite Access Services Network Gateway to provide authorization for the terminal to use the satellite base station.

In further embodiments of the present invention, a wireless communications system includes a terrestrial base station configured to establish communications with a terminal, to receive a request to monitor a satellite base station from the terminal at the terrestrial base station, and to receive monitoring information for the satellite base station corresponding to the request. The terrestrial base station may be configured to suspend transmission to the terminal for a period of time sufficient to allow the terminal to request the monitoring information from the satellite base station. The terrestrial base station may be configured to receive the requested monitoring information at the terrestrial base station from the satellite base station via a communications path not including the terminal. The terrestrial base station may be configured to resume transmission to the terminal before receiving the requested monitoring information. The system may further include a terrestrial Access Service Network Gateway coupled to the terrestrial base station and configured to receive the monitoring information from a satellite Access Service Network Gateway serving the satellite base station and to convey the monitoring information to the terrestrial base station.

In still further embodiments of the present invention, a wireless communications system may include a terrestrial base station configured to receive a first handoff request message for a handoff to a satellite base station from a terminal at a terrestrial base station, to transmit a corresponding second handoff request message to a controller of the satellite base station, to receive a first handoff confirmation message corresponding to the second handoff request message from the controller of the satellite base station at the terrestrial base station and to transmit a corresponding second handoff confirmation message to the terminal from the terrestrial base station. The first handoff request message may include satellite link information for the terminal. The terrestrial base station may be further configured to pre-register the terminal with the satellite base station prior to receiving the first handoff request message, such that the first handoff request message need not include satellite link information for the terminal. The system may further include a terrestrial Access Services Network Gateway configured to control the terrestrial base station and to communicate with a satellite Access Services Network Gateway that control the satellite base station, and the terrestrial Access Services Network Gateway may be configured to negotiate with the satellite Access Services Network Gateway responsive to the second handoff request message to authorize the terminal to use the satellite base station.

DETAILED DESCRIPTION

Figure 1:
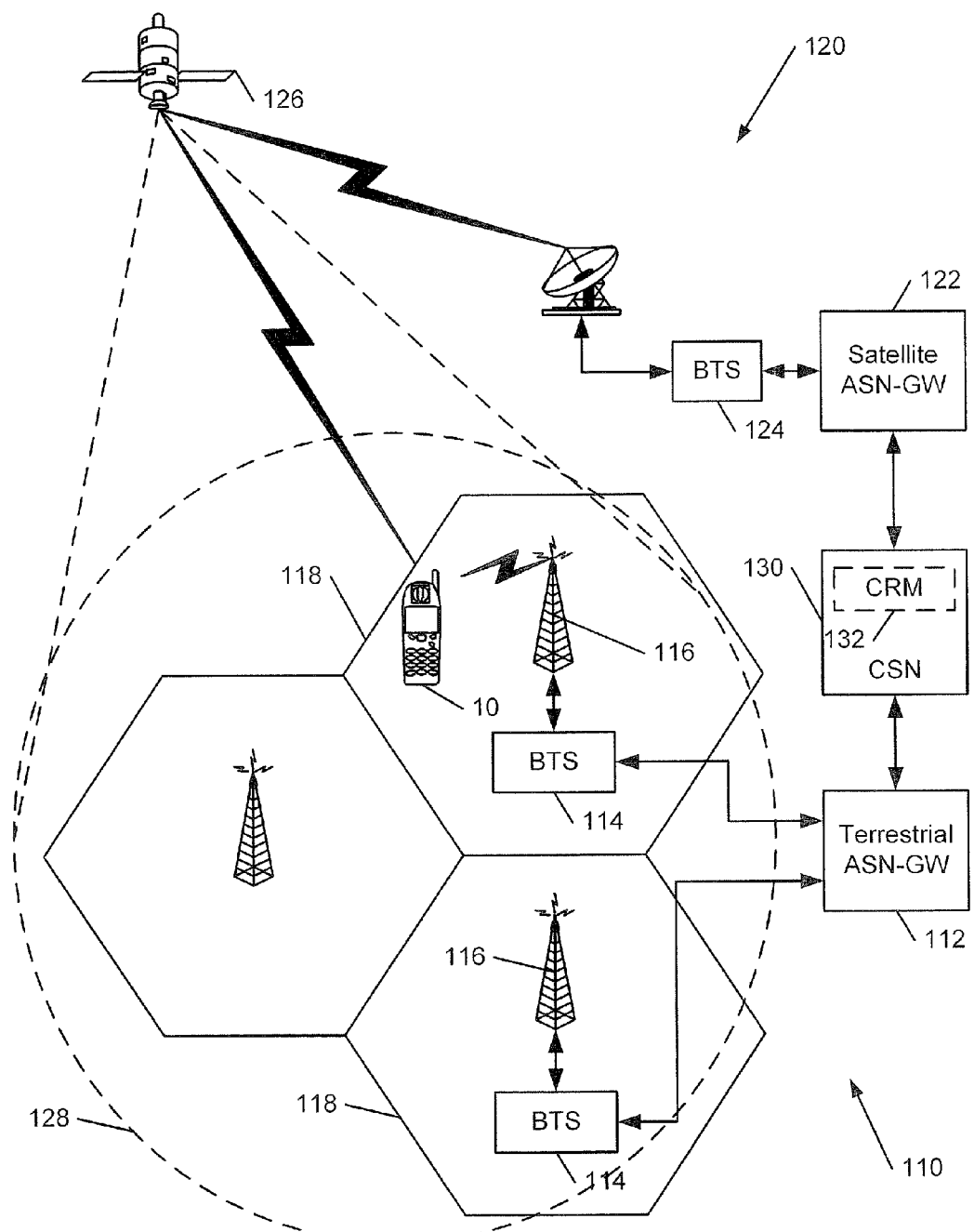
FIG. 1 is a schematic diagram of a hybrid satellite/terrestrial wireless communications system according to some embodiments of the present invention.

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

In accordance with some embodiments of the present invention, techniques for handoff of communications sessions between terrestrial and satellite networks are provided. In some embodiments, methods and apparatus are provided for interoperation between terrestrial and satellite segments of a hybrid network. A unified radio resource manager (RRM) enables cooperation between two segments in obtaining and disseminating information to facilitate handoff between inter-terrestrial and terrestrial-satellite links.

In other embodiments of the present invention, a user terminal may monitor both terrestrial and satellite links and exchange this information with a unified RRM. After handoff is initiated, RRM entitles of the network may participate to provide a seamless uninterruptible handoff.

Systems and methods according to some embodiments of the present invention may enable a user to establish and maintain a communication session that may be seamlessly handed between a terrestrial network and a satellite network. For example, such techniques may enable a communication session to be handed from a terrestrial wireless network to a satellite network and/or from a satellite network to a terrestrial network.

According to some exemplary embodiments of the invention, air interface protocols for terrestrial and satellite networks are OFDMA based. However, other air interface protocols may be used with other embodiments of the invention.

Some embodiments of the present invention provide methods and apparatus that perform user terminal originated handoff from a terrestrial link to a satellite link. FIG. 1 shows a hybrid terrestrial-satellite network including a space-based component 120 and a terrestrial component 110. The terrestrial component 110 includes at least one base station transceiver (BTS) 114 that transmits and receives radio signals to and from mobile terminals 10 via an antenna 116. The terrestrial component 110 further includes an Access Service Network Gateway (ASN-GW) 112 operatively coupled to the one or more BTSs 114, and configured to route communications thereof to support mobile communications over cells 118 of the terrestrial component 110. The space-based component 120 includes a satellite 126 that is communicatively coupled to ground-based infrastructure including a satellite BTS 124 and a satellite ASN-GW 122, which may function analogously to the terrestrial ASN-GW 112, e.g., by supporting mobile communications over one or more satellite spot beam coverage areas 128 served by the space-based component 120. The spaced-based component 120 and the terrestrial component 110 may be interfaced and managed by a Connectivity Service Network (CSN) 130, which may be configured to support user authentication and other network management functions. The CSN 130 may include, for example, a Central Resource Manager 132 that cooperatively manages radio resources of the space-based component 120 and the terrestrial component 110.

Figure 2:
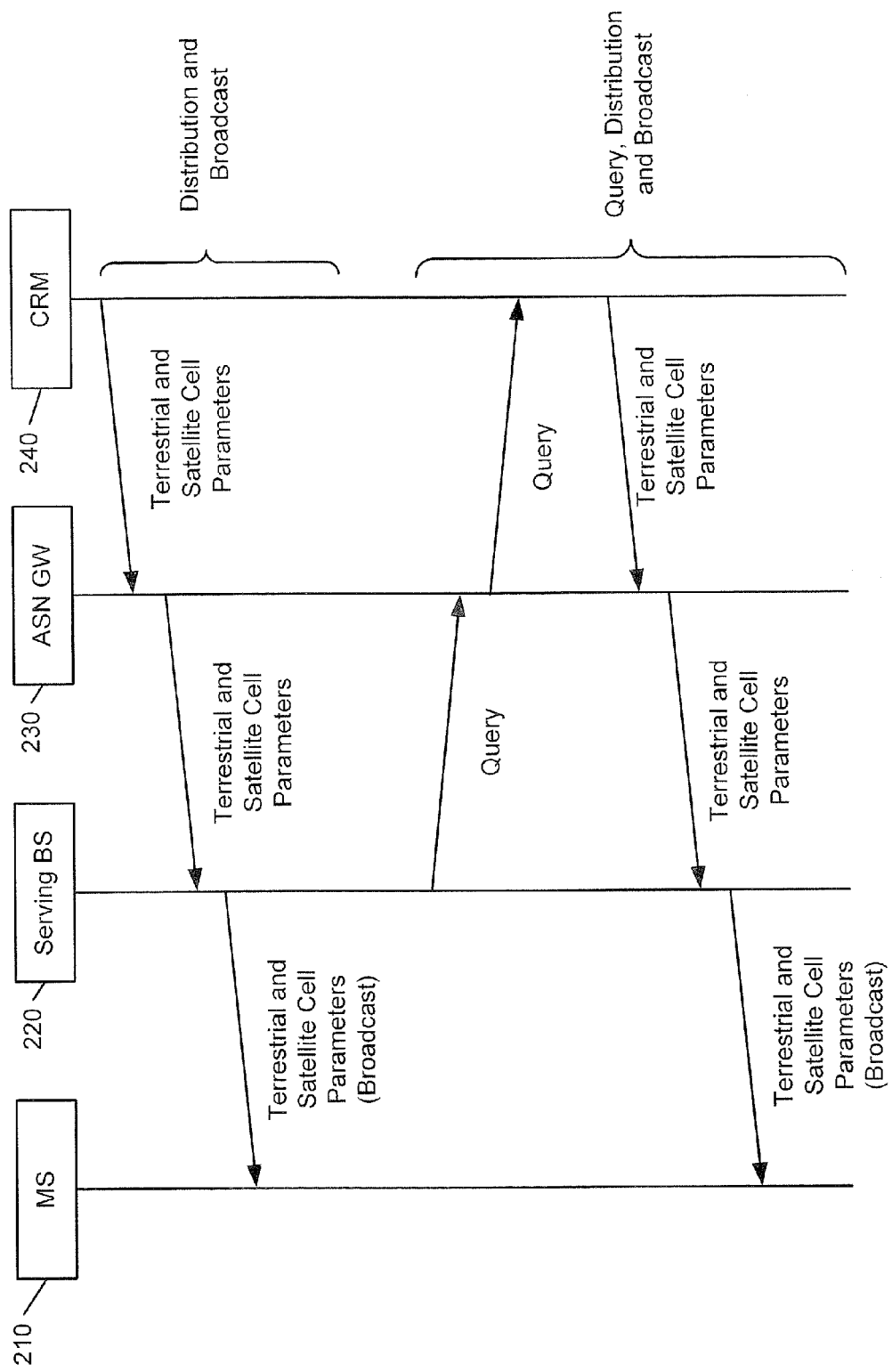
FIG. 2 is a message flow diagram illustrating exemplary operations of the system of FIG. 1 according to further embodiments of the present invention.

As shown in FIG. 2, radio resource management in a hybrid network such as that shown in FIG. 1 may include several entities including, but not limited to, a mobile station (MS) (user terminal) 210, serving base station (BS) (terrestrial or satellite) 220, ASN Gateway (ASN-GW) (terrestrial or satellite) 230 and central resource manager (CRM) 240. For example, the CRM 240 may periodically distribute serving BS's RRM periodically interrogates the ASN-GW to obtain parameters of neighboring terrestrial cells and satellite spot-beam(s). Examples of such parameters may include, but are not limited to, carrier frequency, identification, power, time offset, differential time offset and/or number of tones. The parameters may be stored in a local database at the serving BS 220. In other embodiments, the serving BS 220 can query the CRM 240 to obtain the same parameters. The ASN-GW 230 in turn sends a request to the S-ASN-GW to obtain spotbeam parameters for a satellite link(s) covering the serving BS. The S-ASN-GW response is then delivered to the serving BS, which stores it in a local database. The ASN-GW 230 in turn sends a request to the S-ASN-GW to obtain spotbeam parameters for a satellite link(s) covering the serving BS. The S-ASN-GW response is then delivered to the serving BS, which stores it in a local database. The serving BS 220 may periodically broadcast these parameters wirelessly to all associated terminals 210 to assist, for example, in handoff and related monitoring procedures.

Figure 3:
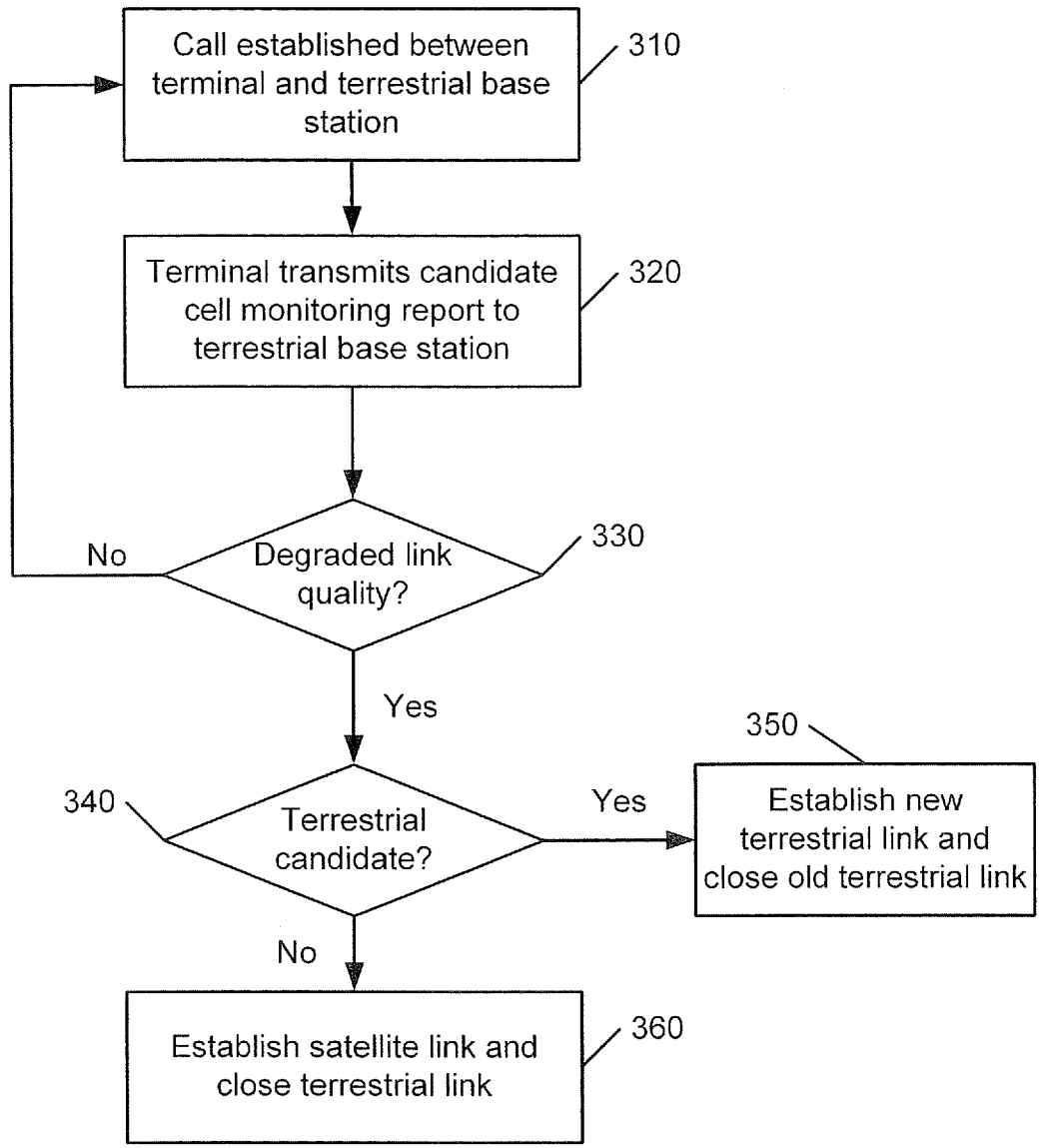
FIG. 3 is a flowchart illustrating exemplary handoff operations of the system of FIG. 1 according to some embodiments of the present invention.

FIG. 3 illustrates an exemplary monitoring process according to some embodiments of the present invention. After a call is established between a terminal and a terrestrial base station (block 310), the terminal may transmit periodic requests for monitoring of candidate base stations to the terrestrial base station. The terrestrial base station may, for example, responsively set up a timer, and responsive to expiration of the timer, may suspend flow of traffic to that particular terminal, allowing it to tune to handoff candidates, perform monitoring and return corresponding monitoring reports (block 330). Examples of the parameters monitored may include, but are not limited to received power, received signal error vector magnitude and/or measured signal/noise ratio. A terminal may also choose to perform periodic ranging to obtain better air link parameters and may pre-register and perform association with neighboring base stations.

Upon detection of degraded link quality (block 330), the terminal may request handoff to an other terrestrial or satellite base station based on the aforementioned monitoring. For example, handover to another terrestrial base station may be preferred and, if a suitable terrestrial handover candidate base station has been identified (block 340), the terminal may be handed over to that terrestrial base station, followed by closing of the connection to the old terrestrial base station (block 350). If a suitable terrestrial candidate is not available, however, the terminal may be handed over to a satellite base station, followed by closing of the existing degraded terrestrial link (block 360).

In some embodiments, after sending a ranging signal or other monitoring request message to a neighboring terrestrial base station, a terminal may wait for a response with the measurement results, and may as well wait for optional control information for association. The serving base station may choose to allocate a longer time when a terminal requests monitoring of a candidate satellite cell. However, longer satellite link propagation time may cause loss of time critical data at the serving BS. In some embodiments of the present invention, a satellite base may send a ranging response via an alternate communication path. For example, a satellite BS may unicast a message to a satellite ASN-GW, which may tunnel it to a terrestrial ASN-GW, which in turn may send it to the serving terrestrial base station. In this manner, the terminal need not wait for a response from the satellite base station on the satellite link and can resume data traffic immediately or soon after sending the ranging signal.

In further embodiments, a terrestrial base station implicitly pre-register a terminal with a space-based component by, for example, sending the terminal's parameters to a CRM and satellite ASN-GW. In such a case, a terminal may not need to perform ranging on the satellite link at all, which may save valuable satellite resources, as the satellite base station may use ranging information for the terrestrial base station vis a vis the satellite base station. In such a technique, physical layer parameters of the hybrid system, such as preamble and symbol durations, may be selected long enough to render errors in the measurements insignificant.

Figure 4:
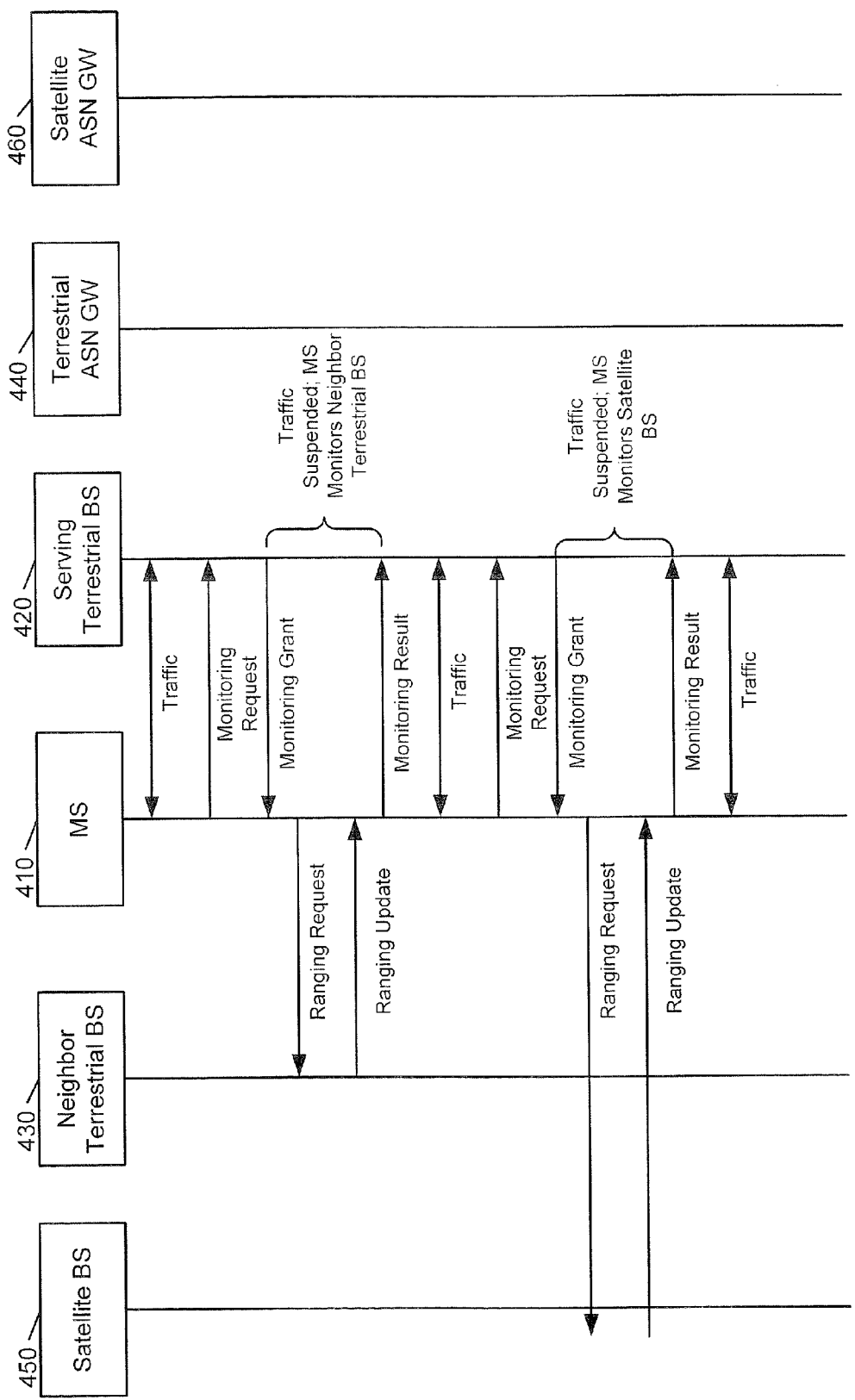
FIGS. 4-6 are message flow diagrams illustrating operations of the system of FIG. 1 according to still further embodiments of the present invention.

FIG. 4 illustrates exemplary monitoring operations according to some embodiments of the present invention. After establishment of a link between a terminal (MS) 410 and a serving terrestrial BS 420, traffic is communicated therebetween. The terminal 410 transmits a request to monitor a neighbor terrestrial BS 430 to the serving BS 420. After elapse of a predetermined period, the BS 420 responds with a grant message and suspends transmission to the terminal 410 for a time sufficient for the terminal 410 to transmit a ranging request to the neighbor terrestrial BS 430 and to receive a ranging update therefrom in response. The terminal 410 transmits the monitoring result to the serving BS 420, and traffic resumes between the serving BS 420 and the terminal 410.

At a subsequent time, the terminal sends a request to monitor a satellite BS 450 to the serving terrestrial BS 420. After elapse of a predetermined period, the BS 420 responds with a grant message and suspends transmission to the terminal 410 for a time sufficient for the terminal 410 to transmit a ranging request to the satellite BS 450 and to receive a ranging update therefrom in response. As noted above, this time may be considerably longer than in the case of monitoring the neighbor terrestrial base station 430. The terminal 410 transmits the monitoring result to the serving BS 420, and traffic resumes between the serving BS 420 and the terminal 410. In the illustrated monitoring operations, the terrestrial ASN-GW 440 and satellite ASN-GW 460 are not involved.

Figure 5:
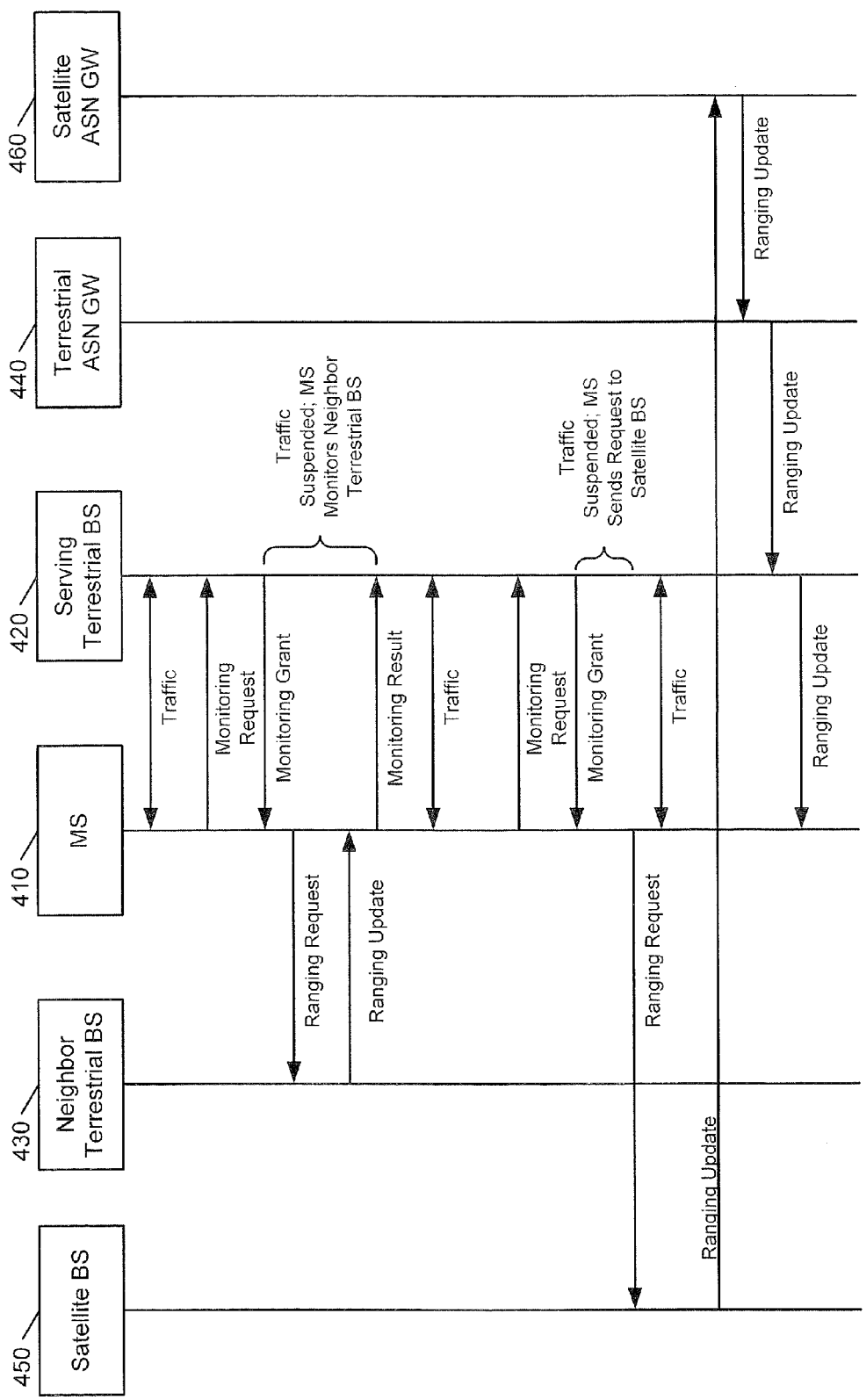

FIG. 5 illustrates exemplary monitoring operations according to further embodiments of the present invention. After establishment of a link between a terminal (MS) 410 and a serving terrestrial BS 420, traffic is communicated therebetween. The terminal 410 transmits a request to monitor a neighbor terrestrial BS 430 to the serving BS 420. After elapse of a predetermined period, the BS 420 responds with a grant message and suspends transmission to the terminal 410 for a time sufficient for the terminal 410 to transmit a ranging request to the neighbor terrestrial BS 430 and to receive a ranging update therefrom in response. The terminal 410 transmits the monitoring result to the serving BS 420, and traffic resumes between the serving BS 420 and the terminal 410.

At a subsequent time, the terminal sends a request to monitor a satellite BS 450 to the serving terrestrial BS 420. After elapse of a predetermined period, the BS 420 responds with a grant message and suspends transmission to the terminal 410 for a time sufficient for the terminal 410 to transmit a ranging request to the satellite BS 450 but, unlike in FIG. 4, does not wait for return of a monitoring result from the terminal 410 to resume traffic transmissions. Instead, the ranging update generated in response to the ranging request from the terminal is conveyed from the satellite BS 450 to the serving terrestrial BS 420 via the satellite ASN-GW 460 and the terrestrial ASN-GW 440, e.g., through a network connection therebetween. Accordingly, the amount of time for which traffic between the terminal 410 and the serving base station 420 is suspended may be greatly reduced.

Figure 6:
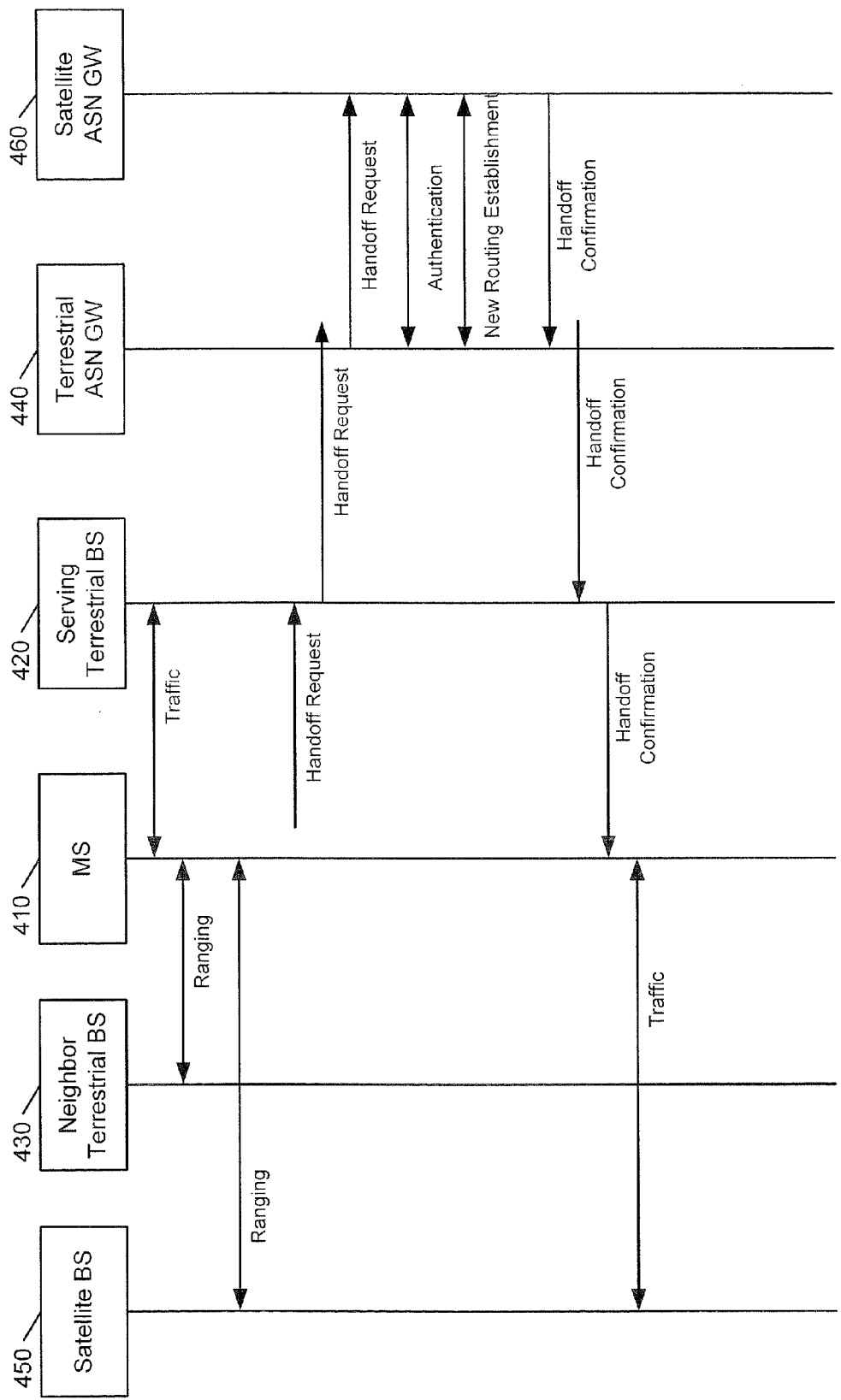

FIG. 6 illustrates exemplary operations for a terrestrial to satellite handoff according to some embodiments of the present invention. A terminal 410 communicating with a serving BS 420 may perform neighbor terrestrial base station and satellite ranging to establish link timing and may initiate a series of interaction with the infrastructure side. In embodiments in which the serving BS 410 implicitly pre-registers the terminal 410 with the satellite ASN-GW 460, such ranging may not be necessary, as discussed above. In some embodiments, the terminal 410 may transmit a handoff request to the serving BS 420 and on to the terrestrial ASN-GW 440 indicating parameters of a link between the terminal 410 and a satellite BS 450. In response, the terrestrial ASN-GW 440 and the satellite ASN-GW 460 may negotiate satellite link availability, e.g., authenticate and establish a new call routing, resulting in communication of a handoff confirmation to the serving terrestrial BS 420. After the terrestrial BS rejects the transition or confirms it by passing the confirmation on to the terminal 410, the terminal 410 may either complete the transition to the satellite link or may remain camped until the connectivity is supported.

In further embodiments, a handoff may not be base station assisted. This may be the case, for example, when the terrestrial component is not aware of the satellite allocation or this data is temporarily un-available. In some embodiments, a MS may negotiate directly with a satellite segment via a satellite link. The satellite BS may allocate the necessary recourses and grant the MS a satellite channel. The satellite BS may inform the terrestrial side of the pending handoff. If the MS is granted the satellite link, it may release the terrestrial allocation and move to the satellite BS. The terrestrial BS may release the allocation and the call may continue on the satellite link.

The present invention was described above with reference to block diagrams, flowcharts and message flow diagrams illustrating methods and apparatus (systems) according to embodiments of the invention. It is understood that operations in the diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the diagrams. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the diagrams.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless communications method comprising:
   establishing communications between a terminal and a terrestrial base station;
   receiving a request to monitor a satellite base station from the terminal at the terrestrial base station;
   granting the request; and
   receiving, at the terrestrial base station, monitoring information for the satellite base station corresponding to the request to monitor, the monitoring information produced responsive to a monitoring communication between the terminal and the satellite base station conducted in response to the granting of the request.

2. The method of claim 1:
   wherein granting the request comprises suspending transmission from the terrestrial base station to the terminal for a period of time sufficient to allow the terminal to request the monitoring information, from the satellite base station; and
   wherein receiving monitoring information comprises receiving the requested monitoring information at the terrestrial base station via a communications path not including the terminal.

3. The method of claim 2, wherein suspending transmission from the terrestrial base station to the terminal is followed by resuming transmission to the terminal before receiving the monitoring information at the terrestrial base station.

4. The method of claim 2, wherein the communications path comprises a terrestrial Access Service Network Gateway serving the terrestrial base station and a satellite Access Service Network Gateway serving the satellite base station.

5. The method of claim 2, wherein the terrestrial base station comprises a first terrestrial base station, and further comprising:
receiving a request to monitor a second terrestrial base station from the terminal at the first terrestrial base station;
suspending transmission from the first terrestrial base station to the terminal for a period of time sufficient to allow the terminal to request and receive monitoring information from the second terrestrial base station; and
receiving the monitoring information for the second terrestrial base station at the terrestrial base station via the terminal.

6. The method of claim 2, wherein the monitoring information comprises ranging information.

7. A mobility management method for wireless communications, the method comprising:
receiving a first handoff request message for a handoff to a satellite base station from a terminal at a terrestrial base station, the first handoff request message including ranging information for communication between the terminal and the satellite base station;
transmitting a corresponding second handoff request message from the terrestrial base station to a controller of the satellite base station from the terrestrial base station;
receiving a first handoff confirmation message corresponding to the second handoff request message from the controller of the satellite base station at the terrestrial base station; and
transmitting a corresponding second handoff confirmation message to the terminal from the terrestrial base station.

8. The method of claim 7, wherein receiving a first handoff request message for a handoff to a satellite base station from a terminal at a terrestrial base station is preceded by the terrestrial base station pre-registering the terminal with the satellite base station.

9. The method of claim 7, wherein the terrestrial base station controlled by a terrestrial Access Services Network Gateway and wherein the satellite base station is controlled by a satellite Access Services Network Gateway coupled to the terrestrial Access Services Network Gateway, and wherein transmitting the second handoff request message is followed by and receiving the first handoff confirmation message is preceded by negotiating between the terrestrial Access Services Network Gateway and the satellite Access Services Network Gateway to provide authorization for the terminal to use the satellite base station.

10. A wireless communications system comprising:
a terrestrial base station configured to establish communications with a terminal, to receive a request to monitor a satellite base station from the terminal at the terrestrial base station, to grant the request and to receive monitoring information for the satellite base station corresponding to the request to monitor, the monitoring information produced responsive to a monitoring communication between the terminal and the satellite base station conducted in response to the granting of the request to monitor.

11. The system of claim 10, wherein the terrestrial base station is configured to suspend transmission to the terminal for a period of time sufficient to allow the terminal to request the monitoring information from the satellite base station and to receive the requested monitoring information at the terrestrial base station from the satellite base station via a communications path not including the terminal.

12. The system of claim 11, wherein the terrestrial base station is configured to resume transmission to the terminal before receiving the requested monitoring information.

13. The system of claim 11, wherein the system further comprises a terrestrial Access Service Network Gateway coupled to the terrestrial base station and configured to receive the monitoring information from a satellite Access Service Network Gateway serving the satellite base station and to convey the monitoring information to the terrestrial base station.

14. The system of claim 13, further comprising the satellite Access Services Network Gateway and the satellite base station.

15. The system of claim 11, wherein the terrestrial base station is further configured to receive a request to monitor another terrestrial base station from the terminal, to suspend transmission to the terminal for a period of time sufficient to allow the terminal to request and receive monitoring information from the other terrestrial base station and to receive monitoring information for the second terrestrial base station via the terminal.

16. The system of claim 11, wherein the monitoring information comprises ranging information.

17. A wireless communications system comprising
a terrestrial base station configured to receive a first handoff request message including ranging information for communication between a terminal and a satellite base station, to transmit a corresponding second handoff request message to a controller of the satellite base station, to receive a first handoff confirmation message corresponding to the second handoff request message from the controller of the satellite base station at the terrestrial base station and to transmit a corresponding second handoff confirmation message to the terminal from the terrestrial base station.

18. The system of claim 17, wherein the terrestrial base station is further configured to pre-register the terminal with the satellite base station prior to receiving the first handoff request message.

19. The system of claim 17, further comprising a terrestrial Access Services Network Gateway configured to control the terrestrial base station and to communicate with a satellite Access Services Network Gateway that control the satellite base station, and wherein the terrestrial Access Services Network Gateway is configured to negotiate with the satellite Access Services Network Gateway responsive to the second handoff request message to authorize the terminal to use the satellite base station.

* * * * *